E. P. Baugh,
Bone Mill.
No. 2577.
Reissued Apr. 30. 1867.
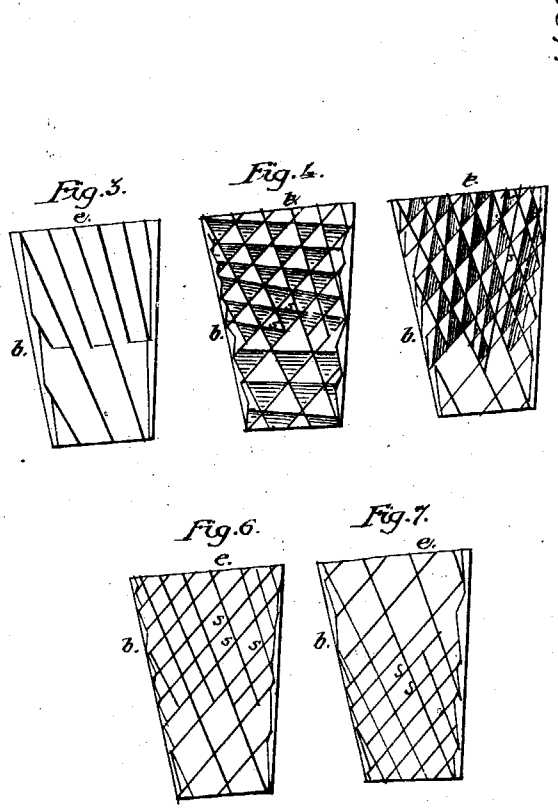
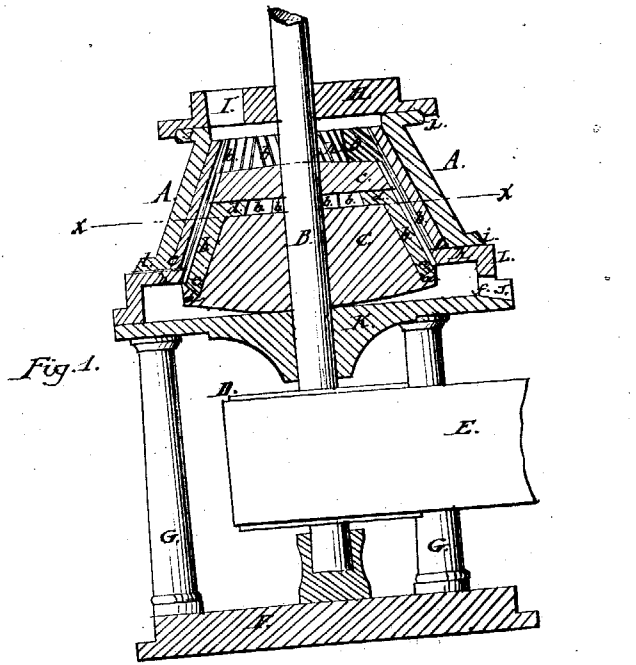
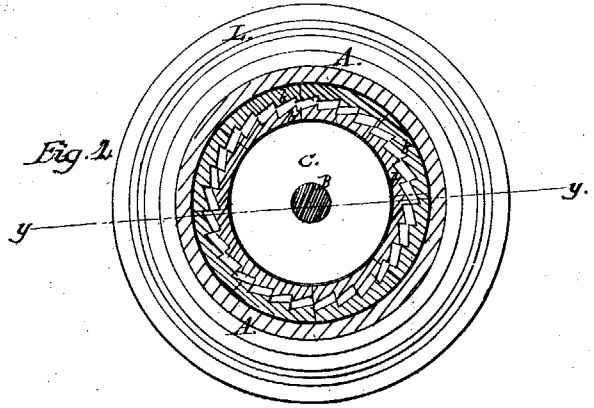
Witnesses:
Geo. L. Tilton
Theo. Lusch
Inventor:
E. P. Baugh
By Munn & Co
Attorneys
N. PETERS, PHOTO-LITHOGRAPHER, WASHINGTON, D. C.

United States Patent Office.

EDWIN P. BAUGH, OF PHILADELPHIA, PENNSYLVANIA.

*Letters Patent No. 46,627, dated March 7, 1865; reissue No. 2,577, dated April 30, 1867.*

IMPROVEMENT IN GRINDING-MILLS.

The Schedule referred to in these Letters Patent and making part of the same.

TO ALL WHOM IT MAY CONCERN:

Be it known that I, EDWIN P. BAUGH, of Philadelphia, Pennsylvania, have invented an improved Grinding-Mill; and I do hereby declare the following to be a full, clear, and exact description of the same, reference being had to the accompanying drawing, and to the letters of reference marked thereon.

My invention relates to the construction of conical cast-metal grinding-mills, and consists, among other things, of a novel mode of constructing the grinding portion of such mills with the view of obtaining more available grinding surfaces for reducing bones and other refractory substances.

In order to enable others skilled in the art to make and use my invention, I will now proceed to describe its construction and operation, reference being had to the accompanying drawing, which forms a part of this specification, and in which—

Figure 1 is a vertical section of my improved grinding-mill.

Figure 2, a sectional plan on the line *x x*; and

Figures 3, 4, 5, 6, and 7 views of the cast sections forming part of the mill.

In the present instance the mill is supported on legs G G, secured below to the floor F, and above to the lower plate K of the mill, through the central hub of which passes the vertical shaft B, the lower end of the latter turning in a step secured to the floor. This shaft is furnished with a pulley, D, for receiving a driving belt from any adjacent driving-shaft. The grinding portion of the burr of the mill consists of a number of detachable cast-metal sections, *b*, held together in the present instance in the following manner: C is a frustum of a cone, at the lower edge of which is formed a ledge, *a*, bevelled on the inside for the reception of the lower ends of the tapering cast-iron sections *b*, which are fitted snugly to the cone and to each other, the sections having upper flanges or projections *d* overlapping the top of the cone. On the convex front of each section is made the dress or grinding surface, shown in figs. 3, 4, 5, 6, and 7, the sections being represented as inverted in these views. The sections are held down firmly to the ledge *a* by a plate, *c*, (which is slightly convex on the top,) and by suitable bolts not shown in the drawing. The shaft B passes through and is secured to the cone C, and also through the plate *c*, the latter revolving with the shaft. It will now be seen that the burr of the mill is composed of a number of cast-iron sections with grinding surfaces, the said sections being held in place by the cone and plate. L is a ring composed of the vertical portion *g*, the lower horizontal flange *f* resting on and secured to the plate K, and the upper horizontal flange *h*, which extends nearly to the burr, and to which the shell A is secured. The interior of this ring L forms a receptacle for the reception of the ground material, which leaves the shell through an opening, J. The shell A consists of an outer cast-iron casing and inner tapering sections, *b*, each of the latter being adapted on one side to the inside of the casing, and having on the opposite side a grinding surface or dress of any required design. These sections are held in place by simply resting on the ring L, no fastening being required, as they are so fitted together and so backed by the outer casing as to be self-sustaining in their proper relative position. The outer casing has a lower flange, *i*, secured to the ring L, and upper flange *j* secured to and supporting the top plate H, through which the shaft B passes, and in which is an opening, I, for admitting the materials to be ground to the hopper, which is comprised in the space between the under side of the top plate H and the convex upper surface of the plate *c*. It will be understood that the form of the shell is made to so conform to that of the burr that the grinding surface of one shall be parallel, or nearly so, with that of the other. The edge of the plate *c* may be formed into a grinding surface, and the dress of the mill may be of any character to suit the grinding to be done.

In ordinary conical or cylindrical grinding-mills having a cast dress, the character of the latter is limited, owing to the necessity of making it in straight lines, parallel, or nearly so, with the axis of the casting, in order to withdraw the patterns from the sand with facility. When the burr and shell are cast in one piece, moreover, it is almost impossible to secure truth of circle. In order to produce a grinding surface which may have a cast dress made of irregular and broken lines, such as are shown in figs. 4, 5, 6, and 7, I construct the grinding portions by casting them in sections or divisions, *b*, and thereby avoid, among other things, all defects which arise from the unequal construction of cylinders in cooling, and am able to secure accuracy in the dress and other surfaces of the castings. An indefinite number of changes may be made in the character of the dress when this mode of constructing the grinding portions of conical mills is followed. The dresses illustrated in figs. 4, 5, 6, and 7 are a few examples only. It will be evident to those familiar with the construction and operation of conical grinding-mills that the dress must be made to suit the material to be ground; a dress for grinding bones, for instance, would be unsuitable in some respects for grinding quartz. In grinding other substances it may be advantageous to have a different dress in the different sections, or for the dress of some sections to differ from that of others. The burr may be adjusted to or from the shell, or the shell to or from the burr, when the grinding surfaces have to be brought nearer together or further from each other. For this purpose mechanical devices well known to those familiar with the machinery of this class may be employed.

When any part of the dress becomes worn out, or any section becomes broken, or it is desirable to vary the character of the grinding surfaces, repairs or changes can be made by supplying new or different sections or divisions *b* without disturbing other parts of the mill, and without replacing or removing the whole of the grinding surfaces.

I claim as my invention, and desire to secure by Letters Patent—

1. Constructing the shell A of a number of tapering cast-iron sections, *b*, and an exterior cast-iron casing, the said sections being adapted to the casing and held in place substantially in the manner described.

2. Constructing the burr of a number of tapering cast-iron sections, *b*, held in place substantially in the manner described.

3. The ring L made separate and distinct from the shell, but serving to support both the outer casing of the same and the sections *b* of the shell, as set forth.

In testimony whereof I have signed my name to this specification before two subscribing witnesses.

EDWIN P. BAUGH.

Witnesses:
H. HOWSON,
JOHN WHITE.